(12) United States Patent
Yoshida et al.

(10) Patent No.: US 6,322,142 B1
(45) Date of Patent: Nov. 27, 2001

(54) CHILD SEAT WITH INCLINATION INDICATOR

(75) Inventors: Junichi Yoshida; Osamu Nakagawa, both of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/406,121

(22) Filed: Sep. 27, 1999

(30) Foreign Application Priority Data

Sep. 30, 1998 (JP) .................................................. 10-277370

(51) Int. Cl.⁷ ....................................................... B60N 2/28
(52) U.S. Cl. ................... 297/250.1; 297/256.13; 297/256.16
(58) Field of Search ........................... 297/250.1, 256.13, 297/256.16; 33/371

(56) References Cited

U.S. PATENT DOCUMENTS

| 3,492,047 | | 1/1970 | Dudouyt et al. . | |
| 4,047,755 | * | 9/1977 | McDonald et al. | 297/256.13 X |
| 4,971,392 | * | 11/1990 | Young | 297/256.12 |
| 5,058,283 | | 10/1991 | Wise et al. . | |
| 5,524,964 | * | 6/1996 | Weimersheimer | 297/256.12 |
| 6,152,528 | * | 11/2000 | van Montfort | 297/256.13 X |

\* cited by examiner

*Primary Examiner*—Peter R. Brown
(74) *Attorney, Agent, or Firm*—Kanesaka & Taktuchi

(57) ABSTRACT

A child seat is formed of a bottom squab on which buttocks of a child is seated, a seat back connected to the bottom squab for supporting a back of the child, and side walls disposed on side portions of the bottom squab and the seat back. An indicator for indicating an inclination angle of the child seat is arranged on a top of one of the side walls. In the child seat, the inclination angle of the seat can be easily checked through the indicator, thus facilitating the attachment of the child seat to a vehicle seat.

12 Claims, 6 Drawing Sheets

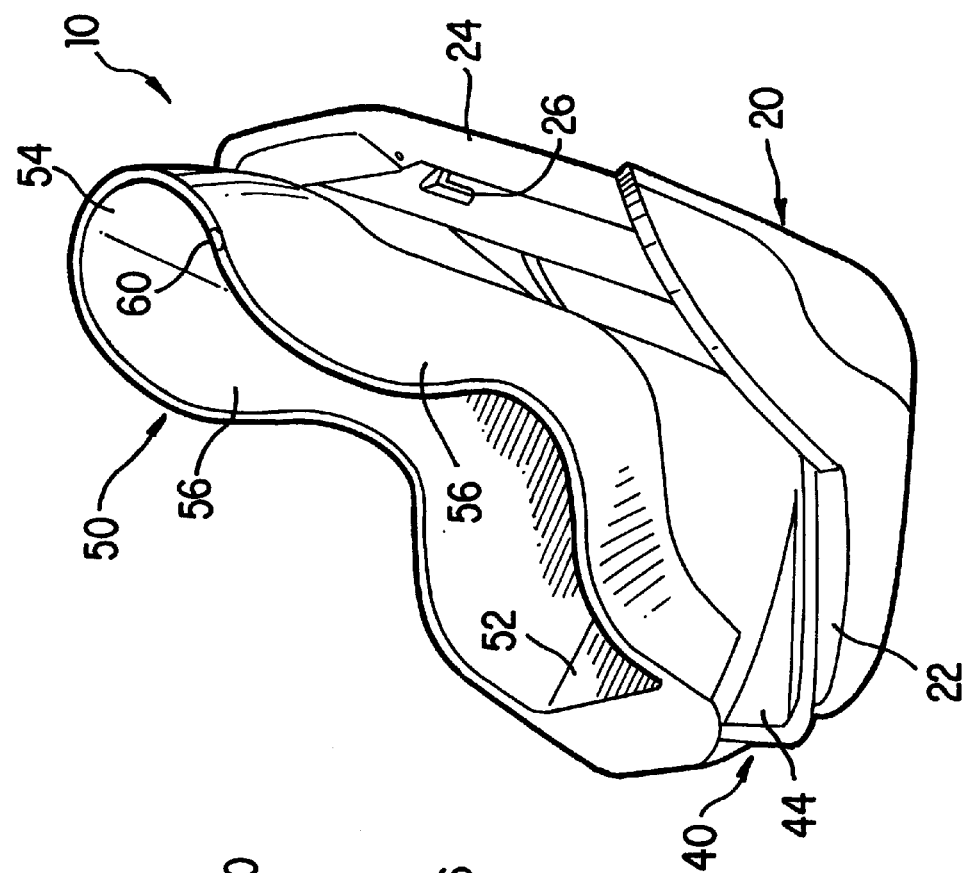
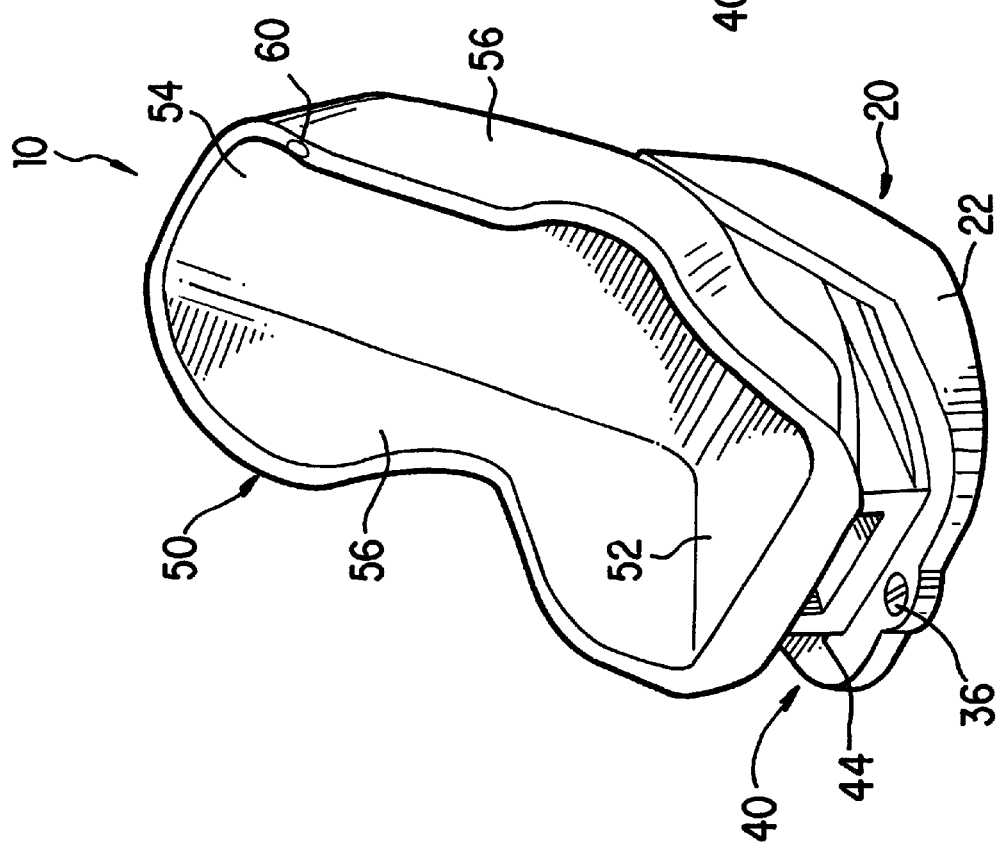

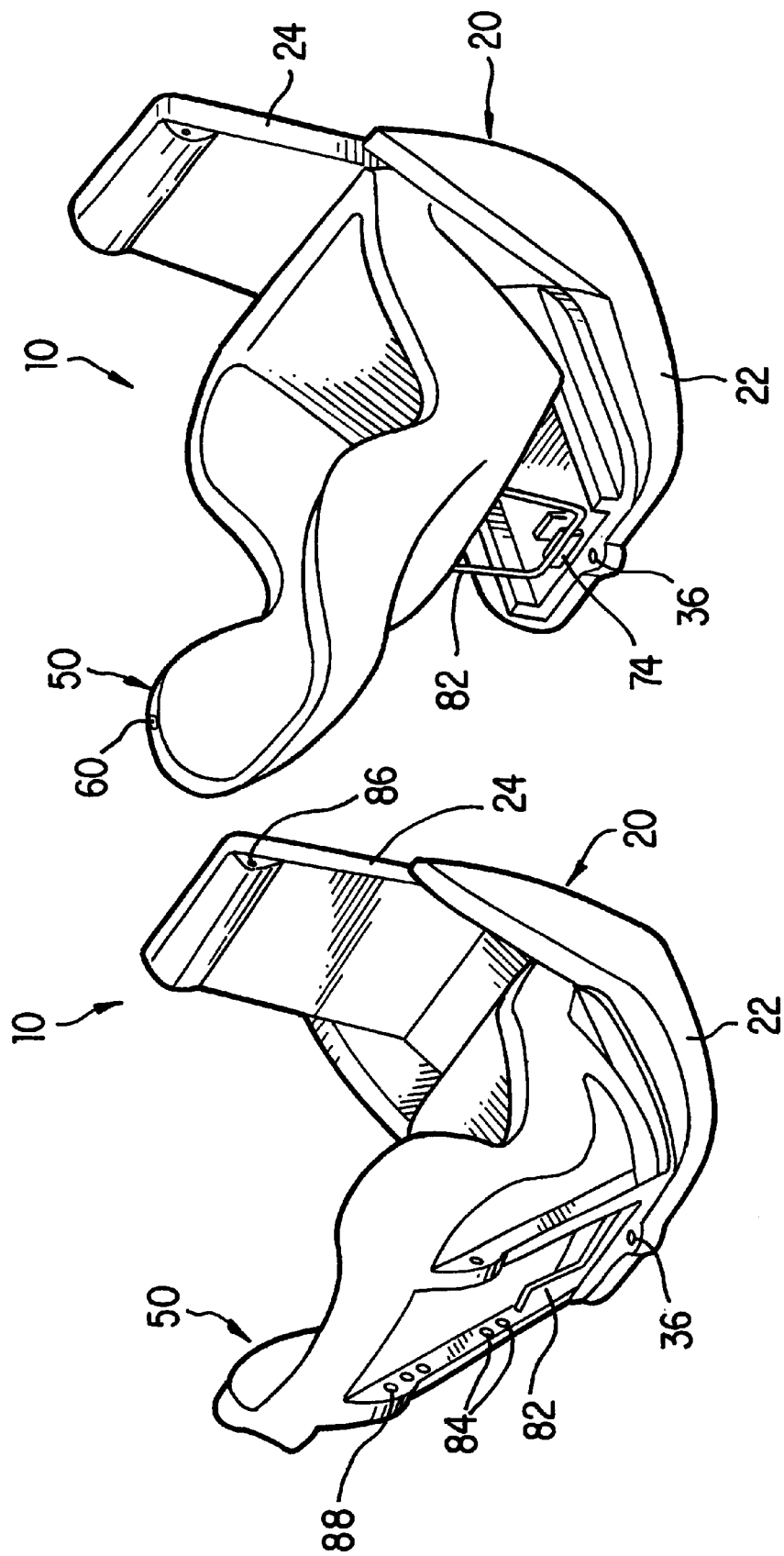

CHILD SEAT WITH INCLINATION INDICATOR

BACKGROUND OF THE INVENTION AND RELATED ART STATEMENT

The present invention relates to a child seat to be set on a seat of a vehicle, such as an automobile, and, more particularly, to a child seat provided with an indicator for indicating inclination of the child seat.

A child seat with an indicator of this type is disclosed in U.S. Pat. No. 5,058,283. The child seat comprises a bottom squab on which the buttocks of a child is seated, a seat back to contact with the back of the child, and side walls disposed on both sides of the bottom squab and the seat back. The indicator is arranged on a side, i.e. outer surface, of one of the side walls. The indicator comprises an arc-like guide passage, a ball housed in the guide passage so that the ball can freely roll and move in the guide passage, and a printed sheet disposed along the guide passage. The child seat is set on a vehicle seat in such a manner that the ball in the guide passage is positioned in a proper range printed on the sheet.

A child seat of this type, i.e. in which an indicator is disposed on one side of the side walls is also disclosed in U.S. Pat. No. 3,492,047.

It is extremely hard to look the indicator disposed on the side of the side wall. This means that an adult, who is about to set the child seat on the vehicle seat, should deeply bend down his or her body to bring the eyes close to the side of the side portions.

It is an object of the present invention to provide a child seat with an inclination indicator, wherein the indicator can be easily checked visually, thus facilitating the attachment of the child seat to a vehicle seat.

Another object of the invention is to provide a child seat with the inclination indicator as stated above, wherein the indicator can be easily prepared and attached to the child seat.

Further objects and advantages of the invention will be apparent from the following description of the invention

SUMMARY OF THE INVENTION

A child seat of the present invention comprises a bottom squab on which the buttocks of a child is seated, a seat back to contact with the back of the child, side walls disposed on both sides of the bottom squab and the seat back, and an indicator for indicating the inclined angle of the child seat. In the child seat of the invention, the indicator is arranged on the top of one of the side walls.

In the child seat, since the indicator is arranged on the top of the side wall, it is easy to look the indicator. Therefore, the operation for attaching the child seat to a vehicle seat is facilitated.

The indicator may comprise a rockable pendulum, a pointer formed integrally with the pendulum, and a display arranged adjacent to the pointer.

The indicator may comprise a casing, a top surface of which is curved concavely in an arc-like shape, a roller which can freely roll along the top surface, and a display disposed on the top surface of the casing.

The child seat may have a seat shell comprising the bottom squab, the seat back and the side walls which are integrally formed, and a base which holds the seat shell such that the seat shell can be rotated and reclined.

BRIEF DESCRIPTION OF THE DRAWINGS

FIG. 1(*a*) is a perspective view of a child seat according to an embodiment of the present invention in a state that a seat shell is shifted backward;

FIG. 1(*b*) is a perspective view of the child seat of FIG. 1(*a*) in a state that the seat shell is shifted forward;

FIG. 2(*a*) is a perspective view of the child seat in which the seat shell is rotated by 180° from the state shown in FIG. 1(*b*);

FIG. 2(*b*) is a perspective view of the child seat in which the seat shell is reclined from the state shown in FIG. 2(*a*);

DETAILED DESCRIPTION OF PREFERRED EMBODIMENTS

Hereinafter, an embodiment of the present invention will be described with reference to FIGS. 1(*a*) through 3.

Figure 3:
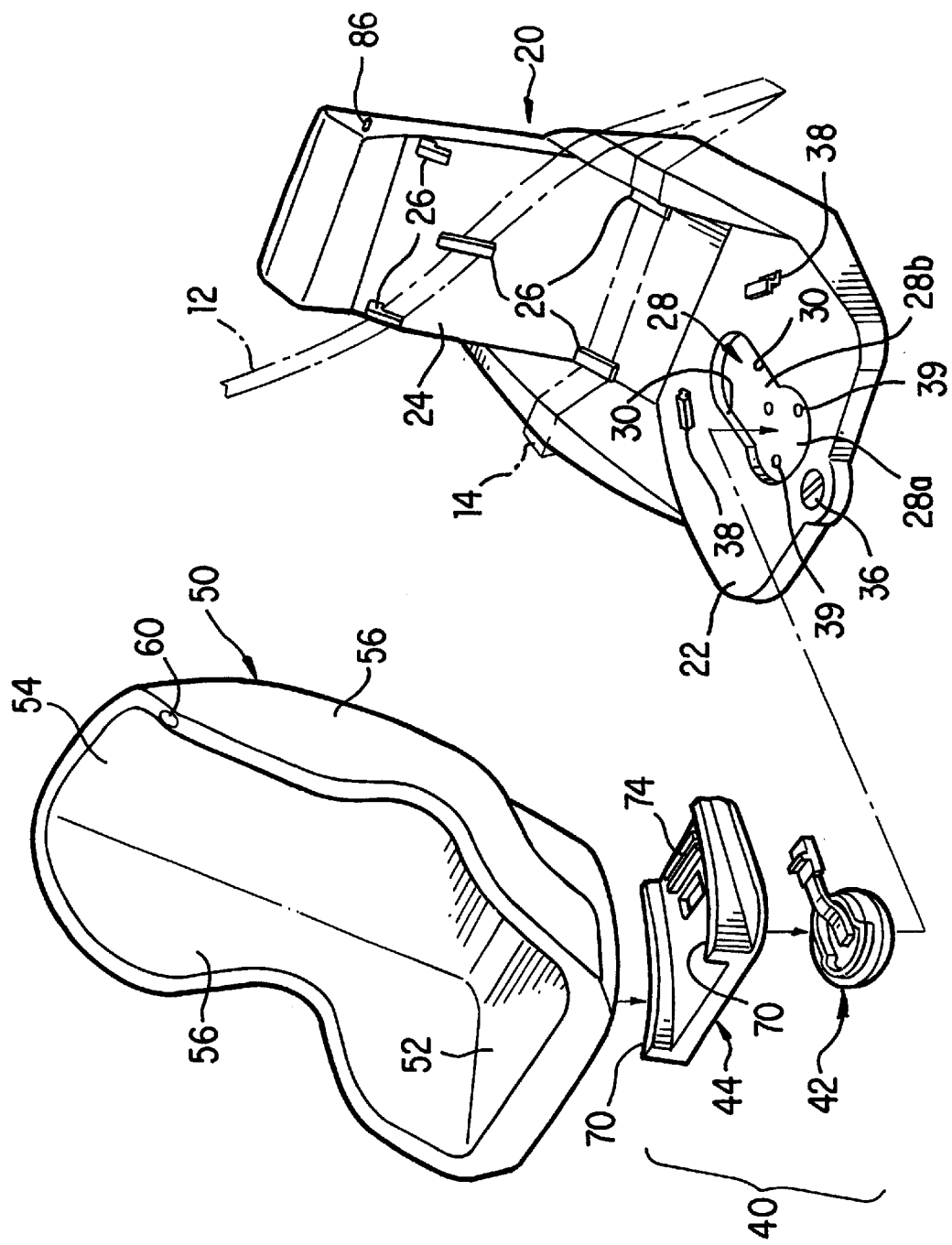
FIG. 3 is an exploded perspective view of the seat shell, a swiveling member, and a base of the child seat.

FIG. 1(*a*) is a perspective view of a child seat according to an embodiment in a state that a seat shell is shifted backward. FIG. 1(*b*) is a perspective view of the child seat of FIG. 1(*a*) in a state that the seat shell is shifted forward. FIG. 2(*a*) is a perspective view of the child seat in which the seat shell is rotated by 180° from the state shown in FIG. 1(*b*). FIG. 2(*b*) is a perspective view of the child seat in which the seat shell is reclined from the state shown in FIG. 2(*a*). FIG. 3 is an exploded perspective view of the seat shell, a swiveling member, and a base of the child seat.

A child seat 10 is secured to a vehicle seat (not shown) by a webbing, i.e. a shoulder belt 12 and a lap belt 14, of a seat belt device of a vehicle. The child seat 10 comprises a base 20, a swiveling member 40, and a seat shell 50.

As clearly shown in FIG. 3, the base 20 comprises a bottom 22 which is mounted on a seat squab of the vehicle seat, and a vertical portion 24 standing from a rear portion of the bottom 22 to extend along the seat back of the vehicle seat. Arranged on a front surface of the vertical portion 24 are hooks 26 on which the belts 12, 14 are hooked.

Formed in the upper surface of the bottom 22 is a concavity 28 into which the swiveling member 40 is engaged. The concavity 28 is formed to have a circular portion 28*a* at a front portion thereof and a flat oval portion 28*b* at a rear portion thereof so as to have a keyhole-like configuration as taken from above. Arranged around the peripheral wall of the concavity 28 is an overhung portion 30 so as to form a space between the bottom surface of the concavity 28 and the overhung portion 30, into which an outside flange of a lower plate 42 of the swiveling member 40 enters.

Disposed on a front portion of the top surface of the bottom 22 of the base 20 is a lock knob 36. Arranged on a rear portion, near the concavity 28, of the top surface of the bottom 22 are retainers 38 for an upper plate 44 of the swiveling member 40. Guide rollers 39 are provided in the concavity 28 to help rotation of the swiveling member 40.

The upper plate 44 is superposed on the lower plate 42 and fixed to the lower plate 42 by bolts, screws or adhesives so as to compose the swiveling member 40. The swiveling member 40 is allowed to move in the fore and aft directions along the top surface of the bottom 22 of the base 20 and allowed to rotate.

The seat shell 50 comprises a bottom squab 52 on which the buttocks of a child is seated, a seat back 54 to contact with the back of the child, and side walls 56 disposed on both sides of the bottom squab and the seat back. Arranged on the top of one of the side walls 56 is an indicator 60. The structure of the indicator 60 will be described later.

Formed on the top surface of the upper plate 44 are two elevation bars or projections 70 parallel to each other for supporting the seat shell 50. The top surfaces of the elevation bars 70 are concavely curved in the fore and aft directions of the child seat 10 so as to allow reclining of the seat shell 50.

Projected from the top surface of the upper plate 44 is a stay holder 74 into which a stay 82 (FIG. 2) disposed to the seat shell 50 fits. Insertion holes 84 for the stay 82 are formed at different levels so as to change the reclining angle of the seat shell 50 when the seat shell 50 faces backward.

The aforementioned lock knob 36 is used to lock the swiveling member 40 and the seat shell 50.

As the lock knob 38 is turned in the clockwise direction, pins (not shown) project upward through the concavity 28, whereby the swiveling member 40 is locked. Also, pins 86 project laterally from an upper portion of the vertical portion 24 to enter into holes 88 formed in the back of the seat shell 50, whereby the seat shell 50 is locked. The holes 88 are formed at different height levels. After the reclining angle of the seat shell 50 is adjusted in the state that the seat shell 50 faces forward, the seat shell 50 is allowed to be fixed while keeping the reclining angle.

Figure 4:
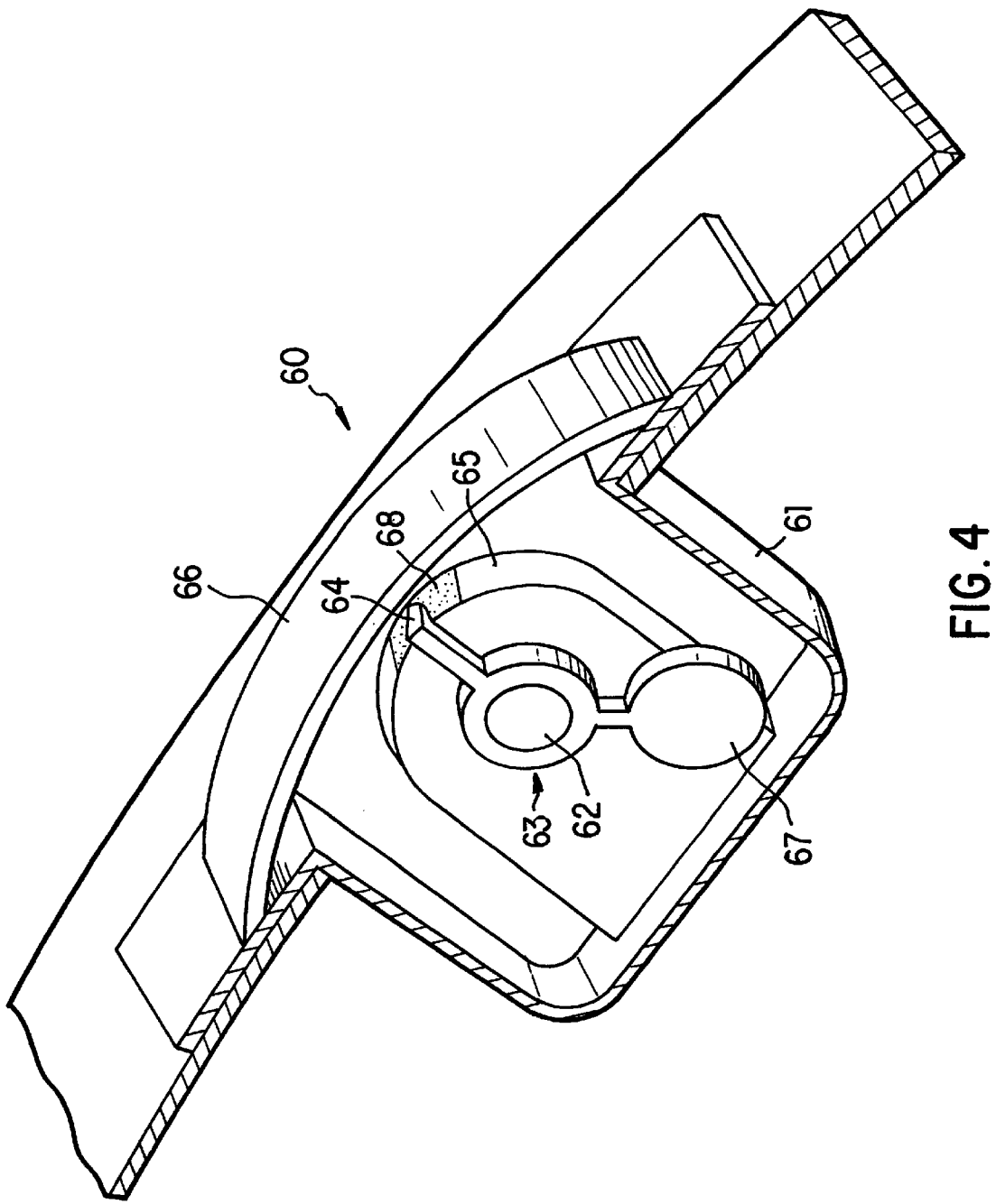
FIG. 4 is a perspective sectional view showing an indicator.

The structure of the indicator 60 will be explained with reference to FIG. 4.

The indicator 60 comprises a casing 61, and means for indicating an inclined angle of the child seat, which includes a pendulum 63 rockably supported by a spindle 62 within the casing 61, a pointer 64 formed integrally with the pendulum 63, a display 65 facing the pointer 64, and a cover 66 covering the casing 61.

The pendulum 63 has a weight 67 which always exerts a force in the vertical direction by virtue of its gravity.

The display 65 includes a green zone 68 made by printing or sticking a two-color paper sheet. Attached on a portion of the child seat where it is easy to see is a notice indicating that the child seat should be set such that the pointer 64 is positioned within the green zone 68. The display 65 also includes red zones outside the respective green zones, but not illustrated.

The way of using the child seat 10 as structured above will be described as follows.

To secure the child seat 10 to the vehicle seat, the lock knob 36 is turned in the clockwise direction to release the locking and then the seat shell 50 is shifted forward as shown in FIG. 1(*b*), or the seat shell 50 is shifted forward and turned to face backward as shown in FIGS. 2(*a*) and 2(*b*). The belts 12, 14 are hooked on the hooks 26, as shown in FIG. 3, so as to secure the child seat 10 to the vehicle seat.

After the child seat 10 is secured to the vehicle seat, the seat shell 50 facing forward is shifted backward and the reclining angle of the seat shell 50 is set properly according to the indicator 60. After that, the lock knob 36 is turned to a locking position (counter-clockwise direction) to lock the seat shell 50. In this state, the child seat 10 is usable in the forward facing state.

To set the child seat to be usable in the state that the seat shell 50 faces backward, the lock knob 36 is turned in the clockwise direction to release the locking and the seat shell 50 is moved forward together with the swiveling member 40. After the lower plate 42 of the swiveling member 40 enters into the circular portion 38*a*, the seat shell 50 is rotated by 180°. In this state, the seat shell 50 is reclined according to the indicator 60. The seat shell 50 is fixed while keeping the reclining angle by the stay 82.

Figure 5:
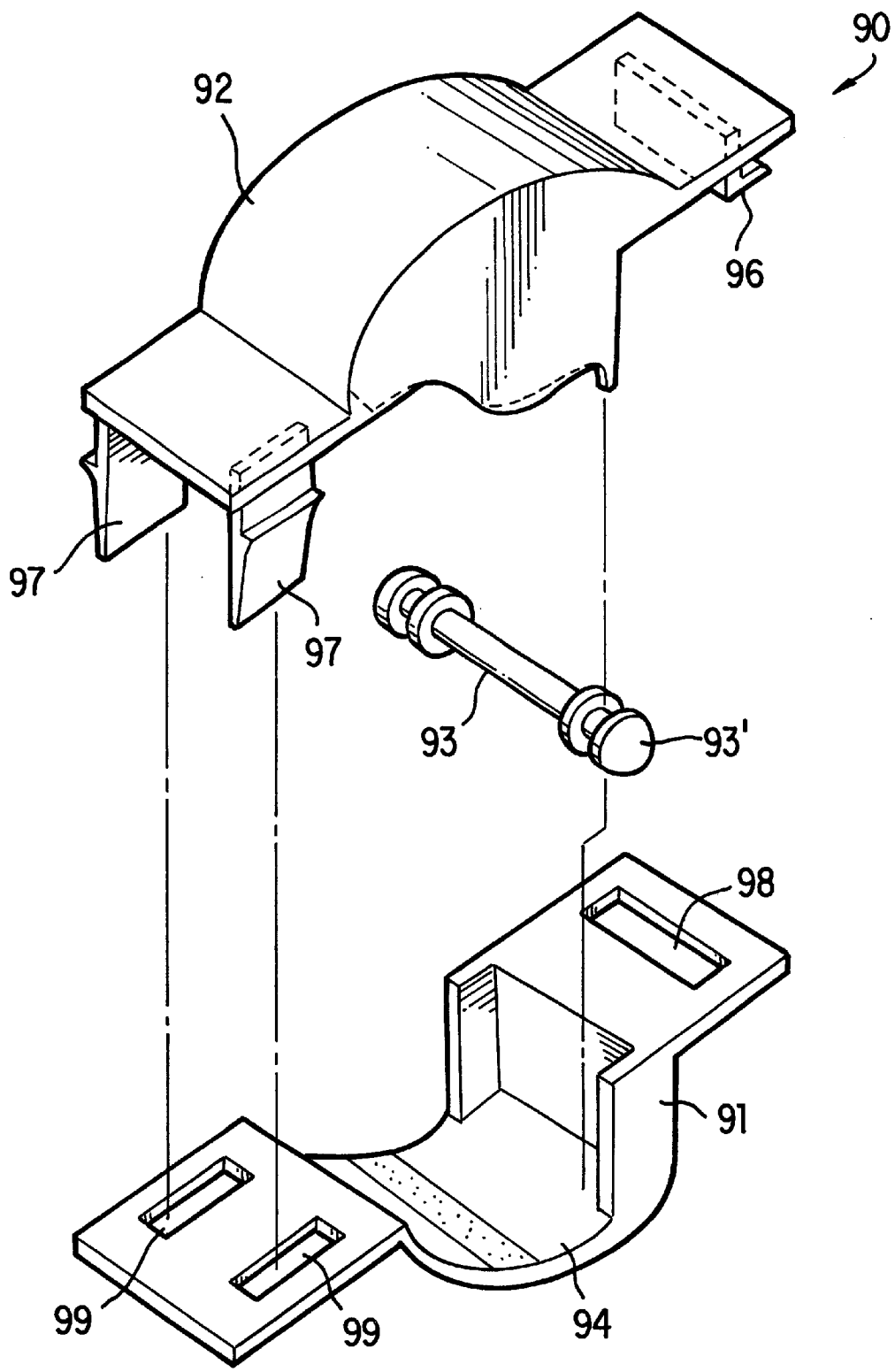
FIG. 5 is an exploded perspective view showing a different indicator.
Figure 6:
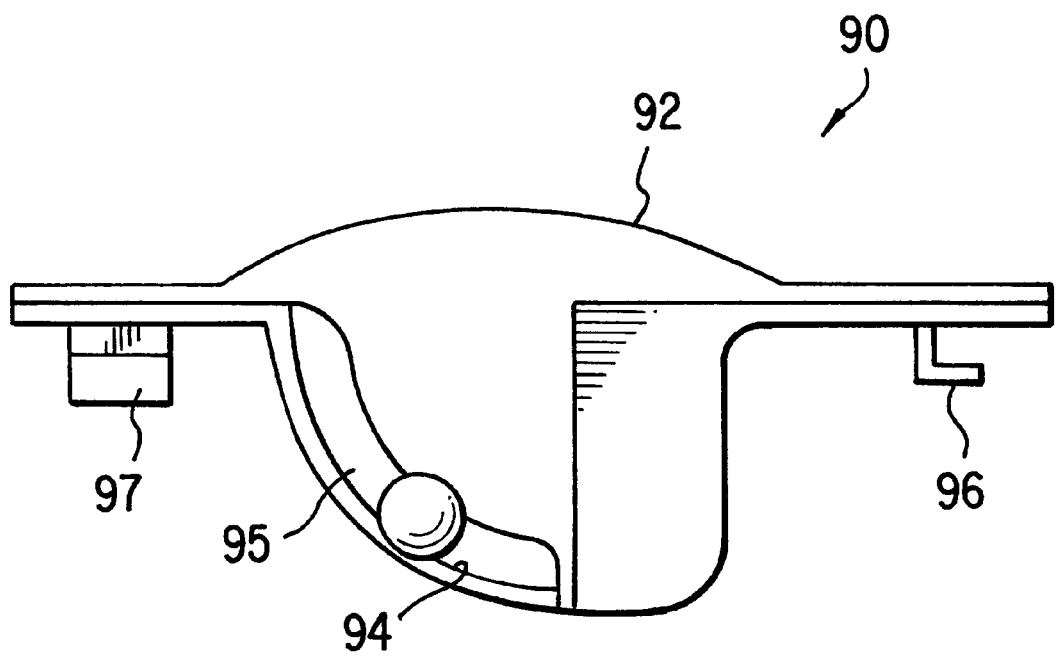
FIG. 6 is a side view of the indicator shown in FIG. 5.
Figure 7:
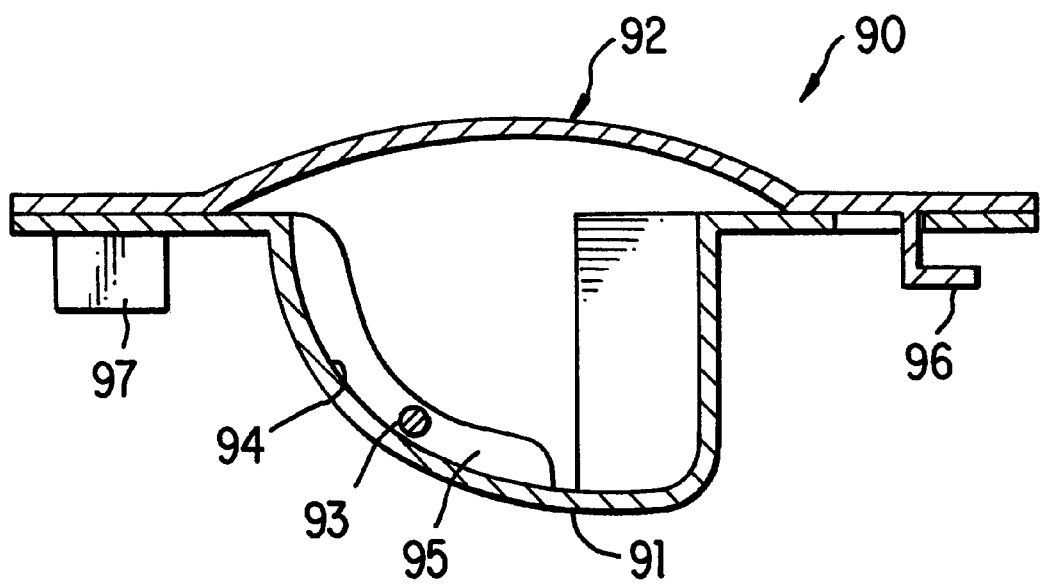
FIG. 7 is a sectional view of the indicator shown in FIG. 5.

A description will now be made as regard to an indicator 90 according to another embodiment with reference to FIGS. 5–7. This indicator 90 has a casing 91, a transparent cover 92 for covering the casing 91, and a roller or weight 93, i.e. means for indicating an inclined angle of the child seat, arranged in the casing 91.

The bottom of the casing 91 is curved concavely in an arc shape and the top surface thereof has a display 94. The display 94 comprises a green zone, and red zones. The child seat is set in such a manner that the roller 93 is positioned within the green zone. Both ends of the roller 93 are held through flanges 93' in slots 95 formed between the bottom of the casing 91 and lower peripheries of the cover 92. The cover 92 comprises a hook 96 and pawls 97 which are inserted into openings 98, 99 formed in the casing 91. This achieves the joint between the cover 92 and the casing 91 and also the attachment of the indicator 90 to the side wall 56.

Either the indicator 60 or the indicator 90 is arranged on the top of the side wall 56 of the seat shell 50, thereby facilitating the visual checking. Therefore, the easy attachment of the child seat 10 and the easy adjustment of the reclining angle of the seat shell 50 can be achieved.

According to the child seat 10 as mentioned above, the belts 12, 14 are allowed to be hooked on the vertical portion 24 in the state where the seat shell 50 is spaced apart from the vertical portion 24 by moving forward the seat shell 50 or further rotating the seat shell 50, thereby achieving the quite easy hooking of the belts 12, 14 onto the hooks 26. For rotating the seat shell 50, the seat shell 50 is shifted forward slightly and then rotated, thereby preventing the seat shell 50 and the vertical portion 24 from interfering with each other and thus facilitating the rotation of the seat shell 50.

As described above, according to the present invention, easy visual checking of the indicator for indicating the inclined angle of the child seat can be achieved, thereby facilitating the operation of fixing the child seat by belts.

While the invention has been explained with reference to the specific embodiments of the invention, the explanation is illustrative and the invention is limited only by the appended claims.

What is claimed is:

1. A child seat comprising:
   a bottom squab on which buttocks of a child is seated,
   a seat back connected to the bottom squab for supporting a back of the child,
   side walls disposed on side portions of the bottom squab and the seat back, and
   an indicator for indicating an inclination angle of the child seat arranged on a top of one of the side walls, said indicator including a casing fixed to the one of the side walls and means for indicating the inclined angle of the child seat rotatably disposed in the casing, said means for indicating the inclined angle of the indicator comprising a rockable pendulum, a shaft rotatably supporting the pendulum, a pointer formed integrally with the pendulum, and a display arranged adjacent to the pointer.

2. A child seat as claimed in claim 1, wherein said pointer is disposed above the display to be seen from the top of the one of the side walls.

3. A child seat comprising:

a bottom squab on which buttocks of a child is seated, a seat back connected to the bottom squab for supporting a back of the child, side walls disposed on side portions of the bottom squab and the seat back, and an indicator for indicating an inclination angle of the child seat arranged on a top of one of the side walls, said indicator including a casing fixed to the one of the side walls and having a concave portion in an arc shape on an upper surface, and means for indicating the inclined angle of the child seat rotatably disposed in the casing, said means for indicating the inclined angle including an elongated roller with flanges free rotatably disposed on the upper surface, and a display disposed on the upper surface of the casing.

4. A child seat as claimed in claim 3, wherein said indicator further includes a cover for covering the casing, a space situated between the casing and the cover, said elongated roller projecting outwardly from the cover through the space and engaging the cover by the flanges, and engaging members for engaging the cover to the casing.

5. A child seat as claimed in claim 4, wherein said engaging member operates to connect the indicator to the one of the side walls.

6. A child seat as claimed in claim 3, wherein said child seat has a seat shell including said bottom squab, said seat back and said side walls which are integrally formed together, and a base for holding the seat shell such that the seat shell can be rotated and reclined.

7. A child seat comprising:

a bottom squab on which buttocks of a child is seated, a seat back connected to the bottom squab for supporting a back of the child, side walls disposed on side portions of the bottom squab and the seat back, and an indicator for indicating an inclination angle of the child seat arranged on a top of one of the side walls, said indicator including a weight rotatably disposed on the one of the side walls according to the inclination angle of the child seat, a rockable pendulum with said weight, a shaft rotatably supporting the pendulum, a pointer formed integrally with the pendulum, and a display arranged adjacent to the pointer.

8. A child seat as claimed in claim 7, wherein said pointer is disposed above the display to be seen from the top of the one of the side walls.

9. A child seat comprising:

a bottom squab on which buttocks of a child is seated, a seat back connected to the bottom squab for supporting a back of the child, side walls disposed on side portions of the bottom squab and the seat back, and an indicator for indicating an inclination angle of the child seat arranged on a top of one of the side walls, said indicator including a weight rotatably disposed on the one of the side walls according to the inclination angle of the child seat, a casing having a concave portion in an arc shape on an upper surface, an elongated roller with flanges free rotatably disposed on the upper surface and forming said weight, and a display disposed on the upper surface of the casing.

10. A child seat as claimed in claim 9, wherein said indicator further includes a cover for covering the casing, a space situated between the casing and the cover, said elongated roller projecting outwardly from the cover through the space and engaging the cover by the flanges, and engaging members for engaging the cover to the casing.

11. A child seat as claimed in claim 10, wherein said engaging member operates to connect the indicator to the one of the side walls.

12. A child seat as claimed in claim 9, wherein said child seat has a seat shell including said bottom squab, said seat back and said side walls which are integrally formed together, and a base for holding the seat shell such that the seat shell can be rotated and reclined.

\* \* \* \* \*